June 2, 1936.  F. MEYER  2,042,794
BLANK SUPPORT FOR A FORMING MACHINE
Filed Oct. 23, 1933
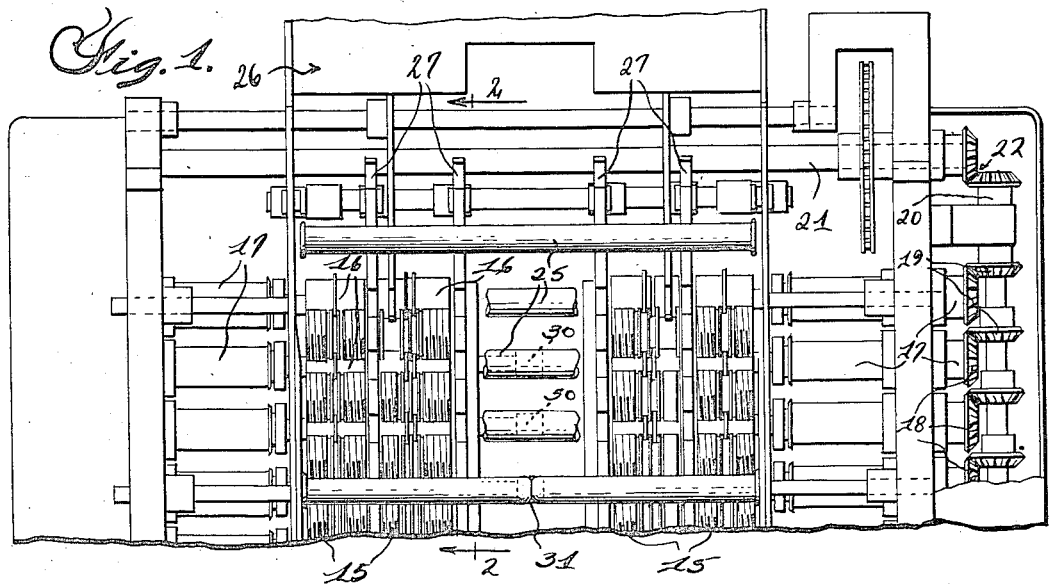
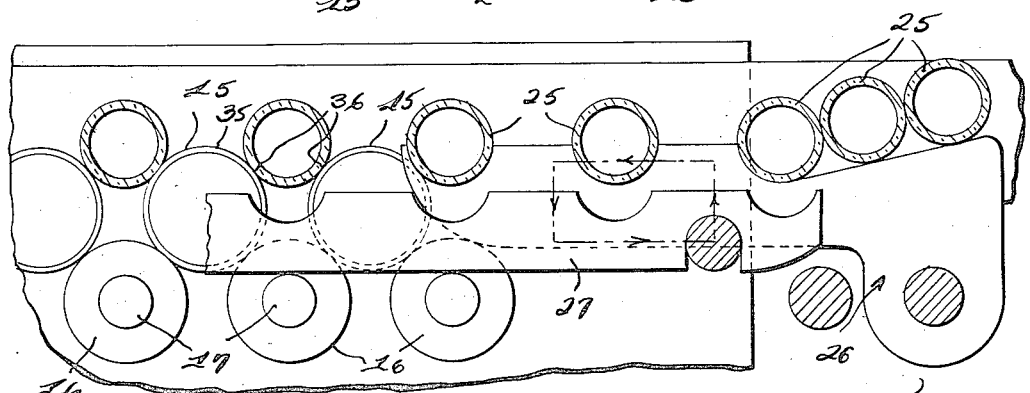
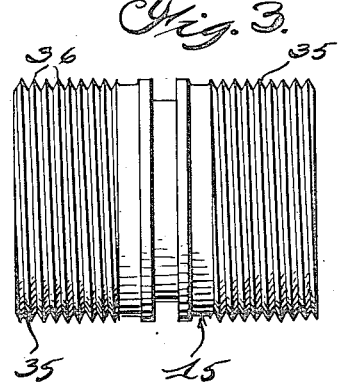
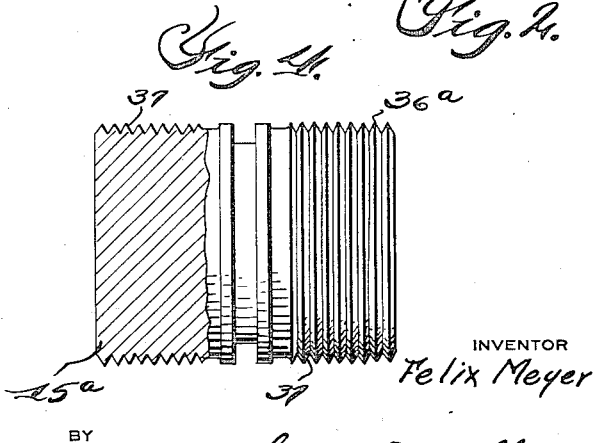
INVENTOR
Felix Meyer
BY
Charles B. Belknap
ATTORNEY Patented June 2, 1936

2,042,794

UNITED STATES PATENT OFFICE 2,042,794

BLANK SUPPORT FOR A FORMING MACHINE

Felix Meyer, Aachen, Germany, assignor to Kimble Glass Company, Vineland, N. J., a corporation of Illinois Application October 23, 1933, Serial No. 694,728
In Germany February 4, 1933

4 Claims. (Cl. 198—127)

This invention relates to a machine for forming glass or like bodies and has particular reference to an improved means in a machine of this character for supporting the blanks to be formed.

One of the primary objects of this invention is to provide a blank supporting means of the above mentioned character which will evenly support the blank during the forming operations.

A further object of the invention is to provide a blank supporting means which will remain substantially clean despite the presence of dirt, products of combustion and the like and which may, when necessary, be conveniently cleaned.

Numerous other objects and advantages of this invention will become more apparent as the following description proceeds particularly when reference is had to the accompanying drawing wherein Figure 1 is a semi-diagrammatic fragmentary top plan view with parts broken away showing a machine in which the invention is embodied;

Figure 2 is a sectional view taken substantially on the line 2—2 of Figure 1;

Figure 3 is an elevational view of one of the supporting members shown in Figure 1; and Figure 4 is an elevational view partly in section of a slightly modified form of supporting member.

In a machine for forming hollow glass bodies such as test tubes, ampoules and the like, it is customary to provide rollers or like supports on which the glass blanks to be formed are rotatably supported. While the blanks are rotated they are subjected to the action of suitable burners which heat the blanks sufficiently to render the same somewhat plastic so they may be blown, lipped or otherwise shaped by suitable tools or the like.

A machine of this general character is disclosed in Figures 1 and 2 as comprising rollers 15 arranged in rows with their axes parallel. The rollers 15 are, in the machine shown, supported on and in the angle between main rollers 16. These main rollers are provided with shafts 17 to which bevel pinions 18 are fixed, these pinions being in turn driven by pinions 19 on a shaft 20. The shaft 20 is suitably driven from a main drive shaft 21 by the interengaging gears 22.

Blanks, such as glass tubes 25, are fed to the machine from a suitable feeding platform 26 and are deposited in the angles between the rollers 15 by suitable transfer bars 27 which are periodically moved in the direction indicated by the arrows in Figure 2 of the drawing, this movement being effected by any suitable mechanism (not shown).

It will be understood that during the operation of the machine the blanks are moved longitudinally of the machine with a step by step movement by the transfer bars 27. During the intervals when the blanks are not being moved by the transfer bars they are supported on and rotatably driven by the rollers 15 which are in turn frictionally driven by the rollers 16.

In the machine illustrated, which is a test tube bottoming machine, the blanks are preliminarily heated at points intermediate their ends by burners 30 and then the heated centers of the blanks are somewhat constricted by a sharp flame from a burner 31. Thereafter the two sections of the tube are drawn apart by suitable means, not shown, and the closed ends of the sections are suitably formed by a forming tool or the like also not shown.

Because of the presence of products of combustion from the burners of the machine and the presence also of dirt, dust and the like, considerable difficulty has heretofore been experienced in keeping the surfaces of the rollers 15 clean. It has been found that after a very short operation of the machine, the rollers 15 have become so coated with dirt and the like as to cause these rollers to unevenly support the glass blanks with the result that the blanks do not rotate uniformly. Frequently the rollers have become so coated as to cause the blanks to creep and jump from their positions on the rollers.

According to the teachings of this invention the above difficulties are eliminated by forming the rollers 15 so that they have in substance only point contact at a plurality of spaced points with the blanks or the like to be supported. The portions of the rollers between the portions thereof which engage the blanks are adapted to receive the dirt which might be deposited on the bearing surfaces. Thus as illustrated in Figures 1 and 3 of the drawing, the rollers 15 are spirally grooved as at 35 to provide a plurality of relatively narrow spaced bearing surfaces 36. It will be noted that the spiral grooves are substantially V-shaped so that the bearing surfaces 36 are sharp angled and have in substance only point contact with the blank to be supported. It is to be noted further that the supporting surfaces 36 are close adjacent each other so that the blank will be adequately supported throughout its entire length and will have sufficient frictional engagement with the rollers to be driven thereby. It will be apparent that with the rollers 15 grooved in this manner, the dirt and the like deposited on the rollers during the use thereof will be pressed into the grooves of the rollers by the blanks so that the bearing surfaces 36 will remain clean for a considerable period of time. Whenever it is desired to clean the dirt from the grooves of the rollers it is only necessary to insert a pointed instrument into the grooves at one end thereof; the pointed instrument following the groove upon the rotation of the rollers will thoroughly clean the groove throughout the length thereof.

In Figure 4 a slightly modified form of construction is disclosed in which the roller 15a is provided with annular grooves 37 which form the spaced bearing surfaces 36a. Thus, whereas the roller shown in Figure 3 comprises a sharp angled screw threadlike supporting surface the roller shown in Figure 4 provides a like support except that the grooves thereof are not spiral.

From the above it will be apparent that the invention provides a blank or body supporting member which will remain clean for a considerable period of time and which will therefore insure that the blank will be evenly supported during the forming operations. The supporting members will support the blank throughout the length thereof and will have in substance only line contact with the blank at a plurality of spaced points.

While the invention will find particular utility in glass body forming machines wherein glass tubes and the like are adapted to be supported during the forming operations, it will be apparent that the inventive principles disclosed may be utilized in the forming of supports for other types of machines regardless of whether the blanks to be formed are of glass or other material.

It is to be therefore understood that the several embodiments disclosed and specifically described are for the purposes of illustration only and are not definitive of the limits of the inventive idea, the right being reserved to make such changes in the details of construction and the arrangement of parts as will fall within the purview of the attached claims.

What I claim as my invention is:

1. In a machine of the class described, means for rotatably supporting a glass tube comprising a pair of rotatable parallel rollers disposed in proximity to each other so as to support the tube with its axis parallel with the axes of the rollers, said rollers being rotatably driven and being grooved throughout their length to provide sharp angled bearing surfaces on which the tube rests.

2. In a machine of the class described, a pair of rotatable spirally grooved rollers disposed adjacent each other with their axes parallel and providing sharp angled screw thread-like bearing surfaces on which a glass tube may be rotatably supported with its axis parallel to the axes of the rollers.

3. In a machine of the class described, means for rotatably supporting a glass body comprising a pair of rotatable parallel rollers disposed in proximity to each other so as to support the glass body with its axis parallel with the axes of the rollers, said rollers being provided with substantially V-shaped grooves which form relatively narrow bearing surfaces on which the glass body rests.

4. In a machine of the class described, means for rotatably supporting a glass body comprising a pair of rotatable rollers disposed in proximity to each other so as to provide between them a support for the glass body, said rollers being provided with V-shaped grooves forming relatively narrow bearing surfaces on which the glass body rests.

FELIX MEYER.